United States Patent [19]

Procunier

[11] Patent Number: 4,533,560

[45] Date of Patent: Aug. 6, 1985

[54] NON-DAIRY PARFAIT TYPE DESSERT MIX

[76] Inventor: Peter Procunier, 68 MacPherson, Ontario, Canada, M5R 1W8

[21] Appl. No.: 519,910

[22] Filed: Aug. 3, 1983

[51] Int. Cl.³ .............................................. A23L 1/187
[52] U.S. Cl. .................................... 426/578; 426/564; 426/613; 426/572
[58] Field of Search ............... 426/578, 579, 572, 661, 426/564, 565, 566, 567, 613

[56] References Cited

U.S. PATENT DOCUMENTS

| | | | |
|---|---|---|---|
| 2,901,355 | 8/1959 | Bangert | 426/579 |
| 3,433,651 | 3/1969 | Diamond | 426/565 |
| 4,338,347 | 7/1982 | Trop et al. | 426/565 |

Primary Examiner—Jeanette M. Hunter
Attorney, Agent, or Firm—Leonard Bloom

[57] ABSTRACT

A non-dairy parfait type dessert mix formed from powdered crystals including sugars, anti-mycotic agents, anti-emulsifiers, salt, flavorings and colorings which are free from unique storage conditions and provide a wholesome dessert simulative of a sherbert, ice cream, yogurt, or parfait.

7 Claims, No Drawings

NON-DAIRY PARFAIT TYPE DESSERT MIX

BACKGROUND OF THE INVENTION

This invention relates generally to desserts which have the texture and appearance of a parfait that does not rely upon dairy products.

In the production of desserts, it is a desired attribute to provide an entity which can be stored without the special provisions of refrigeration, freezing, or the like prior to its use, which at the same time does not compromise the ability of the dessert to suffer from an inordinately short shelf life. Problems associated with achieving goals of this nature include the ability of the compound to not deteriorate as a function of time, to provide a substance which when prepared is of uniform consistency and does not have an undesirable immiscibility of the components, and which when formulated provides a flavorful, refreshing, and stable dessert product.

Heretofore, prior art products which have attempted to embrace these beneficial attributes have been limited by one or more of the foregoing shortcomings to wit: problems in storage, shelf life, and overall appearance due to separation.

The following patents reflect the state of the art of which applicant is aware insofar as these patents appear to be germane to the process at hand.

| Re. | 30,363 | Kratz et al. |
|---|---|---|
| | 3,615,659 | Weber |
| | 4,146,652 | Kahn et al. |
| | 4,201,794 | Sumitani |

It should be apparent that none of these citations teach nor render obvious either singly nor in any conceivable combination that which is defined as the invention in accordance to the instant application. More specifically, the instant application is distinguished over the patent to Kratz et al. in that Kratz teaches the use of a process for imparting a strawberry flavor to food by adding 2-methyl-2-pentenoic acid as the active ingredient for acheiving the flavor associated with strawberries, and is in contradistinction to that which is set forth in the instant application.

Similarly, Weber is directed to providing a chocolate flavored beverage free of sediment which is prepared by mixing an extract with a liquid and subsequent heating and cooling so as to form a precipitate, the precipitate being separated from the rest of the mixture, and packaging the beverage free from the precipitate.

Sumitani is directed to a composition for soft drinks formed from a powder which includes an anthraquinonoid compound, one or more sorts of organic acids and alkaline salts wherein the acids or the salts are coated with water-soluble substances so that the solution subsequently formed experiences a sudden change of color for associated benefits.

Similarly, the patent to Kahn et al. teaches the use of a whippable food that is required to be frozen and is formed from an oil-in-water emulsion including a controlled sugar-fat ratio.

By way of contrast, the instant application is distinguished over the known prior art in that a substance is formed from a plurality of ingredients which before and after admixing neither requires nor benefits from inordinate care in storage such as by refrigeration or the like. It is further distinguished in that the mixture according to the instant application when combined with ingredients commonly found in a kitchen such as water and margarine produces a confection simulative of a parfait and has a pleasing taste which corresponds to conventional analogous foodstuffs.

SUMMARY AND OBJECTS OF THE INVENTION

Accordingly, this invention has as its objective the provision of a dessert formula or the like which is free from the prior art constraints of refrigerated storage while still providing a delightfully tasting parfait.

It is a further object of this invention to provide a dessert of the character described above which is relatively inexpensive and lends itself to mass production techiques.

It is a further object of this invention to provide a dessert of the character described above which can have an extended shelf life without any deleterious effect to the quality of the dessert.

It is still yet a further object of this invention to provide a dessert as characterized above which is capable of being readily mixed by a person of minimum skill.

It is still yet a further object of this invention to provide a dessert as characterized above which provides uniformly consistent texture and flavor when consumed.

It is yet a further object of this invention to provide a dessert as characterized above which is initially in the form of powered crystals so that the substance has a longer shelf life that is not dependent upon heating or cooling for preservation.

It is a further object of this invention to provide a dessert as characterized hereinabove wherein the consistency of the product can be altered by altering the amount of liquid associated in the mix when fabricating, and by altering the storage technique associated therewith after mixing as by chilling or freezing.

It is still a further object of this invention to provide a dessert as characterized above in which the dessert can be mixed and consumed without the addition of any heat or the utilization of any external energy.

A still further object of the invention defines a dessert as set forth hereinabove in which the caloric content of the dessert is substantially reduced over analogous desserts.

These and other objects will be made manifest when considering the following detailed specification wherein there has been provided a substance simulative of a conventional parfait having all of the attributes and none of the associated disadvantages.

These and other objects wil be made manifest when considering the following detailed specification and the associated examples tendered therewith.

DESCRIPTION OF THE PREFERRED EMBODIMENTS

Generally speaking, the dessert in a preferred form is comprised of a base mixture that includes flavorings to which is added a liquid and an oil, the liquid and the oil being commonly found in most households the totality of which comprise the invention in its essence. Typically, the base plus flavorings, the liquid, and the oil are constituent components each added in the ratio of ⅓ of the total weight as given in percent.

It should be understood that the liquid in a preferred form is water, milk, or other substances of like viscosity and is tailored to be mixed with the base and flavorings and the oil at room temperature for ease in preparation. Since no cooking or refrigeration is absolutely necessary for food preparation, the liquids having this viscosity will define a spoonable product capable of adopting the characteristics of a parfait, but alteration and variation of the ratio of liquids to the other substances or a change in the liquid viscosity can alter the properties of the thus formed admixture, so that when refrigerated or frozen, the parfait will adopt a texture of sherbert, ice cream, yogurt, etc. Judicious admixture of the oil, liquid, and base plus flavoring provides an oil in water type emulsion which becomes stablized with the inclusion of the base so that various and minor modifications as to the constituent components can alter the texture in an infinitely varied manner.

In a preferred form, the composition defining the foodstuff according to the instant application includes a base plus flavorings which are in the form of powered crystals and when suitably packaged, a confection has been provided which is free from the constraints found in groceries, restaurants, and the kitchen environment. Free from unique storing conditions such as refrigeration, the powered crystals also exhibit the property of being substantially free from problems associated with encountering wide temperature variations such as mold and decomposition.

The base in a preferred form includes as its primary constituent a sugar which in the present context is to be understood as meaning any of a number of useful saccharide materials which are capable of increasing the osmotic pressure of the water in which they are dissolved and thereby give rise to the requisite bacteriostatic effect. Such sugars may include mono-saccharide, di-saccharide and poly-saccharide and their degradation products: typically, available mixtures of invert sugars are used which contain dextrose and levulose as well as maltose and corn syrup solids. Thus, the sugar is characterized by its substantial resistance to bacterial decomposition and may also serve as a carrying agent for anti-mycotic substances which are incorporated at quantums which prevent the growth of organisms such as yeast and molds. An example of an anti-mycotic agent includes sodium benzoate.

Since the base is to be mixed with an oil and water thereby forming an emulsion, the base also benefits from the inclusion of emulsifiers so as to enhance and maintain the oil in water emulsion for stability and to prevent oxidation. Contemplated emulsifiers include "Tween 60" (polysorbate 60), "Atmos 300" and lecithin. Also suitable are polyglycerides of fatty acids. Many blends of emulsifiers are commerically used and readily available in accordance with the known prior art. For example a lipophilic emulsifier such as glyceryl monostearate or sorbitan monosterate with a hydrophilic material such as polysorbate 60 can be used.

Texture of the base can be enhanced by judicious admixture of an anti-caking agent such as silica or silica (g.s.) 9.5% refers to grams in percentage ratio to other included elements). Starch is also useful in this invention to improve the texture of the finished products, and the unique orientation according to the composition as set forth hereinafter benefit from starches so finished that cooking is not a necessary requisite in preparing the parfait substance according to the instant application. Such starch may include modified starches from potatoes. arrowroot, corn, rice, wheat, maze, sorghum and tapioca.

Salts are used in the composition of this invention for flavoring and include sodium chloride, potassium chloride, and tricalcium phosphate.

A base formulated in accordance with the above can take the following range of constitutent components:

| Sugar | 750–900 grams | 80.72 | 77.17 |
| Starch | 100 grams | 10.76 | 8.57 |
| Silica g.s. 9.5% | 1–2 | .11 | .17 |
| Tricalcium phosphate | 5–10 grams | .54 | .86 |
| Sodium benzoate | 1–3 grams | .11 | .26 |
| Salt | 1 gram | .11 | .06 |
| Potassium chloride | 1 gram | .11 | .06 |
| Tween 60 (polysorbate 60) | 10–20 grams | 1.08 | 1.71 |
| Lecithin | 10–30 grams | 1.08 | 2.57 |
| Dextrose | 50–100 grams | 5.38 | 8.57 |

This base is incorporated thereafter with plural flavorings to provide distinctive parfaits having different tastes thought to be readily appreciated by the consumer.

Flavoring agents, colorings, vitamins and minerals can be employed to impart vanilla, cream, chocolate, coffee, maple, spice, mint, butter, caramel, and other flavors. Additionally, the use of polyols such as sorbitol and mannitol can be employed to alter the texture one perceives in tasting.

As stated briefly above, the base plus flavoring is mixed with equal parts of a liquid such as water and oil or margarine to provide the textured emulsion simulative of a parfait according to the instant application. Variation of the ratios of liquid can alter the texture wherein a lessening of the liquid provides a creamier texture and addition of the liquid can provide a sherbert like texture; of course these two last named texures would benefit from refrigeration.

Fats high in unsaturation and compatible with the powdered crystals include safflower oil, corn, oil, soybean, cottonseed oil, and sunflower oil. Saturated fats may include hydrogenated oil, products of coconut, cottonseed, corn, soybean, peanut, olive, and etc.

The following examples are not intended to be limiting but rather illustrative of some approaches taken and the course of which may be varied in accordance with the scope and spirit of this description. For example:

| DESSERT FORMULA I Example Flavor-Strawberry | | | | |
|---|---|---|---|---|
| Part A. | Sugar | 900 g | 75.45 | |
| | Dextrose | 50 g | 4.19 | |
| | Mannitol | 50 g | 4.19 | |
| | Starch (Instant Clear Gel) | 100 g | | 8.38 |
| | Tri Calcium Phosphate | 10 g | .84 | |
| | Sodium Benzoate | 1.5 g | .13 | |
| | Sodium Chloride | 1 g | .08 | |
| | Potassium Chloride | 1 g | .08 | |
| Mix together in mixer and add Part B | | | | |
| Part B. | Tartaric Acid | 4 g | .34 | |
| | Strawberry | 4.5 g | .38 | |
| | Red Color | .15 g | .01 | |
| Add to Part A in mixer and add Part C | | | | |
| Part C. | Lecithin | 30 g | 2.51 | |
| | Atmos | 20 g | 1.67 | |
| | Tween 60 | 20 g | 1.67 | |
| Mix until uniform | | | | |
| Part D. | Silica g.s. 9.5% | 1–2 g | .08–.16 | |

DESSERT FORMULA I
Example Flavor-Strawberry

Add and mix until dry and flowable

DESSERT FORMULA II
Example Flavor Lemon

| Sugar | 900 g | 75.27 |
|---|---|---|
| Dextrose | 100 g | 8.36 |
| Starch | 100 g | 8.36 |
| Liquid Lecithin | 30 g | 2.50 |
| Liquid Atmos | 30 g | 2.50 |
| Liquid Tween 60 | 10 g | .84 |
| Tri Calcium Phosphate | 10 g | .84 |
| Sodium Benzoate | 1 g | .08 |
| Potassium Chloride | 1 g | .08 |
| Sodium Chloride | 1 g | .08 |
| Lemon Powder | 6 g | .50 |
| Citric Acid | 6 g | .50 |
| Yellow #5 | .1 g | .005 |
| Silica g.s. 9.5% | 1-2 g | .08-.16 |
| Mix dry powders together | | |
| Add liquids | | |
| Mix until uniformly dispersed | | |
| Add silica to make flowable | | |
| Equal Parts | | |
| Mix | 4 oz. put in mixing bowl | |
| Water | 4 oz. add, mix | |
| Margarine | 4 oz. add, mix | |

DESSERT FORMULA III
Example Flavor-Cocoa

| Sugar | 900 g (2 lbs) | 73.0 |
|---|---|---|
| Dextrose | 50 g | 4.06 |
| Mannitol | 50 g | 4.06 |
| Starch (modified food) | 100 g | 8.12 |
| Lecithin | 30 g | 2.43 |
| Atmos 300 | 15 g | 1.21 |
| Tween 60 | 15 g | 1.21 |
| Sodium Benzoate | 1.2 g | .10 |
| Potassium Chloride | 1 g | .08 |
| Sodium Chloride | 1 g | .08 |
| Cocoa Droste | 60 g | 4.87 |
| Vanilla (sugar —) | 3 g | .24 |
| Tricalcium Phosphate | 5 g | .41 |
| Silica g.s. 9.5% | 1-2 g | .08 |
| Vanilla (Mansanto) | .5 g | .04 |
| Put into mixer and mix | | |
| Lecithin ⎫ | 30 g | |
| Atmos 300  ⎬ stir it up first | 15 g | |
| Tween 60 ⎭ | 15 g | |
| Then add to mix | | |
| Silica g.s. 9.5% | 1-2 g | |

DESSERT FORMULA IV
Example Flavor-Mocha

| Dextrose | 100 g | 8.96 |
|---|---|---|
| Starch (instant | 100 g | 8.96 |
| Cocoa Droste | 50 g | 4.48 |
| Coffee (Brim instant | 10+ g | .90 |
| Mannitol | 50 g | 4.48 |
| Tricalcium Phosphate | 10 g | .90 |
| Sodium Benzoate | 3 g | .27 |
| Sodium Chloride | 1 g | .09 |
| Potassium Chloride | 1 g | .09 |
| Vanillin | .2 g | .02 |
| Vanilla (Sugar) | 1 g | .09 |
| Sugar | 750 g | 67.19 |

DESSERT FORMULA IV
Example Flavor-Mocha

| Dry Mix-mix in mixer | | |
|---|---|---|
| Tween 60 (Polysorbate 60) | 15 g | 1.34 |
| Atmos 300 | 15 g | 1.34 |
| Lecithin | 10 g | .90 |
| Stir and mix in with powdered mix | | |

In fabrication, the powdered crystals are contained in a single package and it is powdered contemplated that the portion size of each packet be 4 ounces. The powdered crystals are mixed with 4 ounces of water and 4 ounces of margarine and all are mixed throughly by means of an electric mixer until the desired texture has been achieved. As pointed out above, variations in the percentage of liquids to the remaining constituents will alter the texture: an additional amount of liquids will provide a sherbert-like consistency, while a lessening of the liquids will provide an ice cream-type of texture. The absence of refrigeration would provide a yogurt-type consistency, and it should be apparent that fresh fruits can also be added to the dessert for added benefits.

The invention has been described in terms of specific embodiments set forth in detail, but it should be understood that these are by way of illustrations only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of the invention as defined by the appended claims.

What is claimed:

1. A dry food mix for use in preparing a nondairy parfait product comprising flavoring of from 0.7%-11% and a base containing sugar 65%-81%, starch 7.5%-11%, emulsifiers 2%-6%, anti-caking agents 0.08%-0.2%, salt 0.4%-1.2% and an antimycotic agent 0.08%-0.3%; said mix when added to water and oil in substantially equal weights and mixed forms a non-dairy parfait product.

2. The mix according to claim 1 having a strawberry flavor and consisting of in percent by weight:

| Part A. | Sugar | 75.45% |
|---|---|---|
| | Dextrose | 4.19 |
| | Mannitol | 4.19 |
| | Starch (Instant Clear Gel) | 8.38 |
| | Tri Calcium Phosphate | .84 |
| | Sodium Benzoate | .13 |
| | Sodium Chloride | .08 |
| | Potassium Chloride | .08 |
| Part B | Tartaric Acid | .34 |
| | Strawberry | .38 |
| | Red Color | .01 |
| Part C. | Lecithin | 2.51 |
| | Atmos | 1.67 |
| | Tween 60 | 1.67 |

3. The mix according to claim 1 in which a lemon flavor is provided consisting of in percent by weight:

| Sugar | 75.27 |
|---|---|
| Dextrose | 8.36 |
| Starch | 8.36 |

-continued

| | | |
|---|---|---|
| Liquid Lecithin | | 2.50 |
| Liquid Atmos | | 2.50 |
| Liquid Tween 60 | | .84 |
| Tri Calcium Phosphate | | .84 |
| Sodium Benzoate | | .08 |
| Potassium Chloride | | .08 |
| Sodium Chloride | | .08 |
| Lemon Powder | | .50 |
| Citric Acid | | .50 |
| Yellow #5 | | .005 |
| Silica g.s. 9.5% | | .08–.16 |

4. The mix according to claim 1 in which a cocoa flavor is provided consisting of in percent by weight:

| | | |
|---|---|---|
| Sugar | (2 lbs) | 73.01 |
| Dextrose | | 4.06 |
| Mannitol | | 4.06 |
| Starch (modified food) | | 8.12 |
| Lecithin | | 2.43 |
| Atmos 300 | | 1.21 |
| Tween 60 | | 1.21 |
| Sodium Benzoate | | .10 |
| Potassium Chloride | | .08 |
| Sodium Chloride | | .08 |
| Cocoa | | 4.87 |
| Vanilla (sugar | | .24 |

-continued

| | |
|---|---|
| —) | |
| Tricalcium Phosphate | .41 |
| Silica g.s. 9.5% | .08 |
| Vanilla (Mansanto) | .04 |

5. The mix according to claim 1 in which a mocha flavor is provided consisting of in percent by weight:

| | |
|---|---|
| Dextrose | 8.96 |
| Starch (instant) | 8.96 |
| Cocoa (—) | 4.48 |
| Coffee (Brim instant) | .90 |
| Mannitol | 4.48 |
| Tricalcium Phosphate | .90 |
| Sodium Benzoate | .27 |
| Sodium Chloride | .09 |
| Potassium Chloride | .09 |
| Vanillin | .02 |
| Vanilla (Sugar) | .09 |
| Sugar | 67.19 |
| Tween 60 (Polysorbate 60) | 1.34 |
| Atmos 300 | 1.34 |
| Lecithin | .90 |

6. The mix of claim 1 in which dextrose is included in a percent by weight of between 3 and 10 percent.

7. The mix of claim 1 are in the form of powered crystals disposed in a moisture impervious packet.

* * * * *